United States Patent Office 2,936,839
Patented May 17, 1960

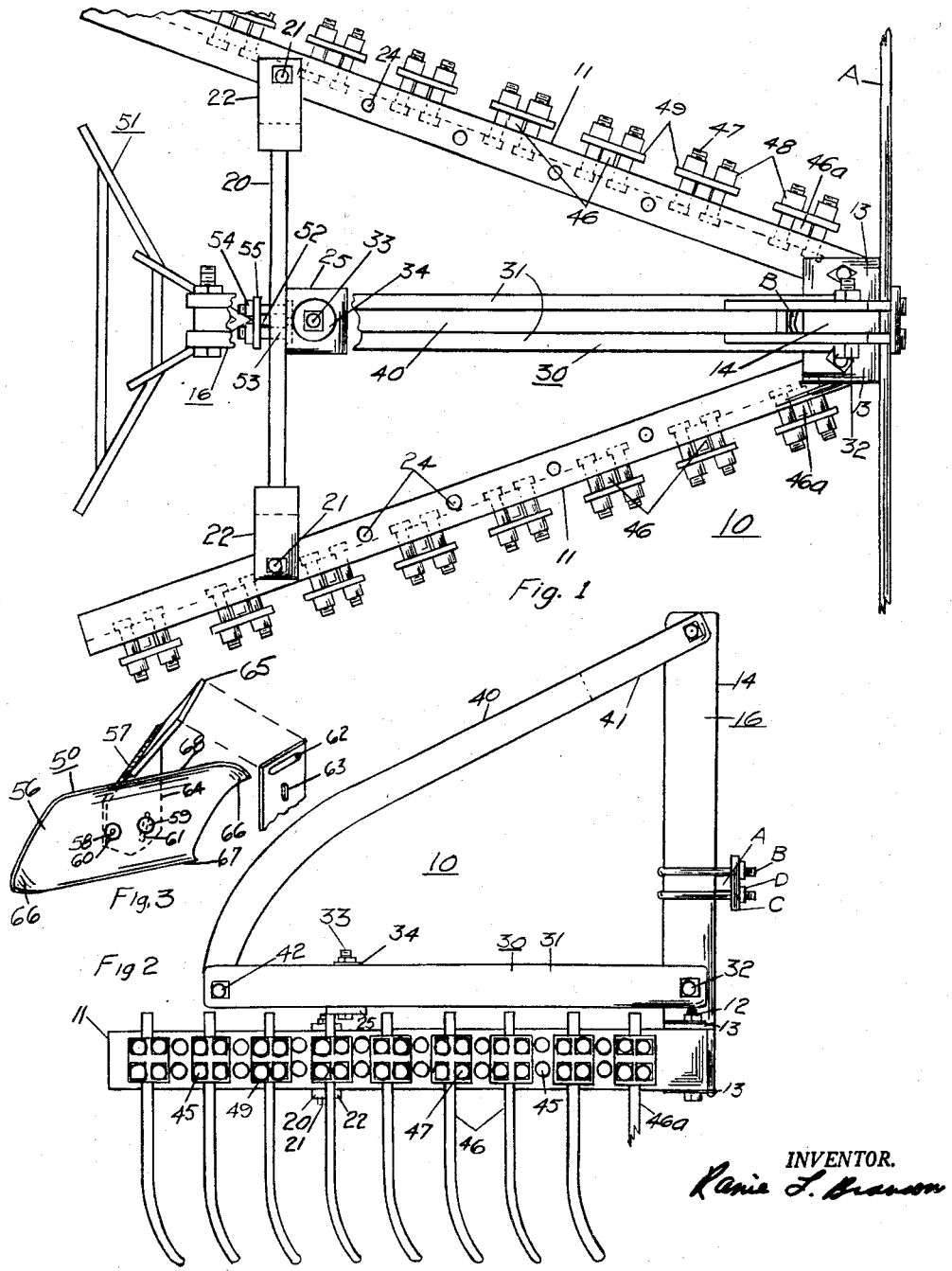

2,936,839

HARROW-CULTIVATOR

Ranie L. Branson, Holtville, Calif.

Application June 24, 1957, Serial No. 667,516

3 Claims. (Cl. 172—200)

This invention relates to an improved agricultural implement and more particularly to a device which combines features of harrows, cultivators and plows.

The device will be referred to herein sometimes as a cultivator, sometimes as a harrow and sometimes as a plow. When any of these terms are used, they shall be understood to mean a device which may be used to loosen soil and remmove weeds, level soil and break clods or plow furrows.

My device is especially useful for, although not limited to, cultivating irrigated crops in sandy soil which has a tendency to pack fairly solidly. Irrigated crops are usually planted in fields which have been plowed in a manner to produce furrows and ridges. The crop is then planted on the ridges. Two rows of the crop may be planted on a single ridge. It has been customary to cultivate such fields by attaching individual tines or plow shares to the horizontal tool bar of a row-crop tractor. Although generally satisfactory, this method of cultivating does have some drawbacks. One drawback resides in the fact that the ground over which the tractor wheels pass is not adequately loosened by the tines or plow shares attached to the tool bar in known manner. Another drawback is that the ridges become somewhat leveled out into the furrows. This necessitates rebuilding the ridges and plowing out the furrows. The primary reason for these drawbacks resides in the fact that the customary horizontal tool bar does not offer enough flexibility to permit attaching proper implements thereto whereby harrowing, cultivating, ridge rebuilding, and furrowing-out can be accomplished to the best advantage. With my improved cultivator, however, the utility of the customary tool bar is greatly increased by providing a separate tool holding portion for the cultivator which may be attached to the conventional tool bar.

An object of the invention is to provide an improved cultivator which may be attached to a conventional tool bar with a minimum of effort.

Another object is to provide in a single implement a cultivator, a harrow, and a plow.

Another object is to provide a cultivator having an improved tool-bar.

A further object is to provide a V-shaped cultivator having thrust transmitting means which transmits a pulling force from the narrow to the wide portion of the V.

A still further object is to provide a cultivator which minimizes leveling of the ridges customarily found in irrigated fields.

The invention will be readily understood by referring to the following detailed specification including the several drawings forming a part thereof, wherein:

Fig. 1 is a plan view of the improved cultivator including a furrowing-out plow;

Fig. 2 is a side elevational view, on a reduced scale, of the improved cultivator; and Fig. 3 is an isometric view of a barrowing sweep which may be used with the improved cultivator.

Referring to Fig. 1, the cultivator 10 is attached to the tool-bar A of a tractor, not shown, by means of a U-clamps B, a bracket C, and nuts D. Tool-bar A is usually horizontally disposed either behind or in front of the rear wheels of the tractor, or both, and is raised and lowered in vertical paths by well known hydraulic means, not shown.

The cultivator 10 includes two tool-holding channels or arms 11 which are pivotally mounted with bolts 12 at their forward ends between protrusions 13 of the upright portion 14 of a force transmitting means 16. The tool-holding channels 11 are maintained in a V-shape relative to each other by adjusting-member 20 which is slidably mounted between the channels 11. The angle between the channels or arms 11 may be increased by sliding member 20 forwardly between arms 11. Member 20 is maintained in position by inserting bolts 21 through the bifurcated ends 22 of member 20 and the holes 24 spaced along the upper webs of the arms 11. A plate 25 is rigidly attached, as by welding, to member 20. Plate 25 is adapted to support the horizontal portion 30 of force transmitting means 16. Horizontal portion 30 consists of two bars 31 which are attached to the upright portion 14 of force transmitting means 16 by a bolt 32 and to plate 25 by means of bolt 33 and large washer 34 (see Fig. 2).

Force transmitting means 16 also includes curved portion 40 which is bifurcated at its forward end 41 to straddle upright portion 14. The other end of curved portion 40 is maintained between the ends of bars 31 remote from upright portion 14 by bolts 42. Force transmitting means 16 assures that the rear portion of the V-shaped tool-holding channel assembly will be given rigidity, will force tools applied thereto into packed soil as tool-bar A is lowered, and will be maintained in a horizontal position as a forward pulling force is applied to upright portion 14 through tool-bar A as the tractor moves forward.

A plurality of holes 45 are spaced along the side of each channel 11 to permit spacing various tools therealong. Figures 1 and 2 show tines 46 attached to channels 11 by means of bolts 47, nuts 48 and plates 49. It may be desirable to replace the forward tines 46a with a barrowing sweep 50 as shown in Figure 3. It may also be desirable to attach a tine 46, furrowing-out tool 51, or other tool to member 20 intermediate its ends 22. In Figure 1, the furrowing-out plow 51 is shaped in well known manner and has an upright shank 52 attached to member 20 by means of bolts 53, nuts 54 and clip 55.

Barrowing sweep 50 consists of a blade 56 adjustably mounted on shank 57 by means of bolts 58 and 59, respectively, which are inserted through hole 60 and slot 61, respectively, in shank 57. Shanks 57 of two sweeps 50 may be attached to the forward ends of tool-holding channels 11 by removing bolts 47 and plates 49 from the forward tines 46a and placing bolts through slots 62 and 63 of barrowing sweep 50. Shank 57 of sweep 50 includes a vertical lower portion 64 and an upper portion 65 welded to the lower portion and forming an angle therewith. Blade 56 of sweep 50 is substantially parallelogramed shaped with diametrically opposed corners having curved extensions 66. The curved extensions 66 are arranged at diametrically opposed corners to permit using either edge 67 or edge 68 of sweep 50 as the bottom, soil contacting portion. The extensions are curved outwardly in the manner shown to prevent the sweep from disturbing the roots of plants being cultivated and to minimize leveling of the barrow or ridge being cultivated.

Operation of the cultivator will be readily understood. When using the cultivator to prepare a plowed field for planting crops therein, a number of cultivators 10 are fitted with a tine 46 in place of the furrowing-out plow 51 shown in Fig. 1. These cultivators may then be spaced along a tool-bar A which may be disposed in front of the tractor wheels. When tool-bar A is lowered by well known hydraulic means, force-transmitting means 16 assures that all tines 46 of each cultivator will be forced into the ground to level the soil and break clods. Additional cultivators 10 may be equipped with furrowing-out plows 51 and attached to tool-bar A behind the rear wheels of the tractor. I prefer to place one such cultivator behind, and in line with, each rear wheel of the tractor to assure that tines 46 will loosen the soil which becomes packed by the wheels. Furrowing-out tools 51 serve to form the loosened soil into alternate rows of ridges and furrows.

A crop may then be planted along the ridges. When it is time to cultivate the crop a cultivator 10 is adjusted to straddle a ridge by sliding adjusting-member 20 along channels 11 until the proper width of the V is attained. Bolts 21 are then placed in the proper hole 24 to prevent member 20 from becoming dislodged. Bars 31 are secured to plate 25 by placing a bolt 33 through plate 25 and securing washer 34 to the top of bars 31 by the nut on bolt 33.

When the cultivator straddles a ridge and the crop growing therealong, obviously neither a tine 46 nor a plow 51 will be attached to member 20. As the cultivator 10 moves along the ridge, soil contacting edge 67 of sweep 50 penetrates the soil immediately adjacent the roots of the crop without disturbing them. The lower curved extention 66 of blade 56 serves to throw soil out away from the crop without leveling the ridge. The angle between the upper and lower portions of shank 57 maintains blade 56 at an angle to the ridge being plowed so that the blade acts somewhat like a hoe as it travels along the ridge.

In some cases, two rows of a crop will be planted on a single ridge. The cultivator 10 is assembled and adjusted for cultivating such a crop by inserting a tine 46 between bolts 53 in member 20 in place of plow 51. Tines 46a take the place of sweeps 50 at the front of the cultivator 10 and one tine 46 intermediate the ends of each channel or arm 11 is removed. Cultivator 10 is then mounted on tool-bar A in such a manner that the tine 46 which was inserted between bolts 53 on member 20 will travel along the ridge between the two rows. Each channel 11 will then straddle a row of the crop.

Weeds are removed from the furrows by adjusting cultivator 10 to fit between the ridges. For this purpose, cultivator 10 is preferably equipped with tines 46 and 46a as shown in Fig. 2. A furrowing-out plow 51 is attached to cultivator 10 as shown in Fig. 1 to assure that the furrows will be plowed out and that any ridges that may have become leveled will be rebuilt.

It will be apparent to those skilled in the art that tines 46, plow 51 and barrowing sweep 56 are old. Thus it is seen that my invention comprises a new and useful tool carrying device which may be used in combination with known tools as a new agricultural implement.

While the invention has been illustrated and described in certain detail for illustrative purposes, it will be apparent to persons skilled in the art that certain modifications and details of construction may be incorporated therein without departing from the spirit and scope of the appended claims.

I claim:

1. A cultivator including a force transmitting means having an upright portion, V-shaped tool-holding means having its apex pivotally attached to said upright portion, adjusting means horizontally disposed between the arms of said V-shaped tool-holding means, and cultivating tines disposed substantially perpendicular to the arms of said tool-holding means, characterized by a furrowing out plow having an upright portion rigidly affixed to said adjusting means and that said force transmitting means includes a curved portion having one end pivotally connected to said upright portion and a horizontal portion having one end pivotally connected to said upright portion, another end pivotally connected to said curved portion and an intermediate portion rigidly connected to said adjusting means.

2. In a cultivator tractor of the row-crop type wherein a horizontally disposed tool-bar is provided on said tractor, the combination which comprises a V-shaped cultivator assembly including force-transmitting means having an upright portion adjustably affixed to said tool-bar substantially perpendicular thereto, V-shaped tool-holding means having its apex pivotally attached to said upright portion, adjusting means removably attached to the arms of said tool-holding means for maintaining said arms in horizontally spaced relation, and cultivating tools affixed to said tool-holding means, characterized in that said force-transmitting means consists of a curved portion having a bifurcated end pivotally connected to the upper end of said upright portion, and two horizontal portions each having one end pivotally connected to opposed sides of said upright portion intermediate said bifurcated end and said apex, another end pivotally connected to opposed sides of said curved portion at its end remote from said bifurcated end and an intermediate portion rigidly connected to said adjusting means.

3. The device of claim 2 further characterized in that said cultivating tools include a furrowing-out plow having an upright portion affixed to said adjusting means substantially perpendicular thereto.

References Cited in the file of this patent

UNITED STATES PATENTS

| | | |
|---|---|---|
| 386,146 | Mallery | July 17, 1888 |
| 627,965 | Bateman | July 4, 1899 |
| 837,166 | Willcutt | Nov. 27, 1906 |
| 847,142 | Wolf | Mar. 12, 1907 |
| 1,083,364 | Jones et al. | Jan. 6, 1914 |
| 1,086,449 | Gage | Feb. 10, 1914 |
| 1,375,086 | Faubion | Apr. 19, 1921 |
| 2,690,708 | Dreher | Oct. 5, 1954 |
| 2,808,772 | Mabe | Oct. 8, 1957 |